1,001,623. EMERGENCY-TIRE. CHARLES M. CULP, South Bend, Ind. Filed July 20, 1910. Serial No. 572,810.

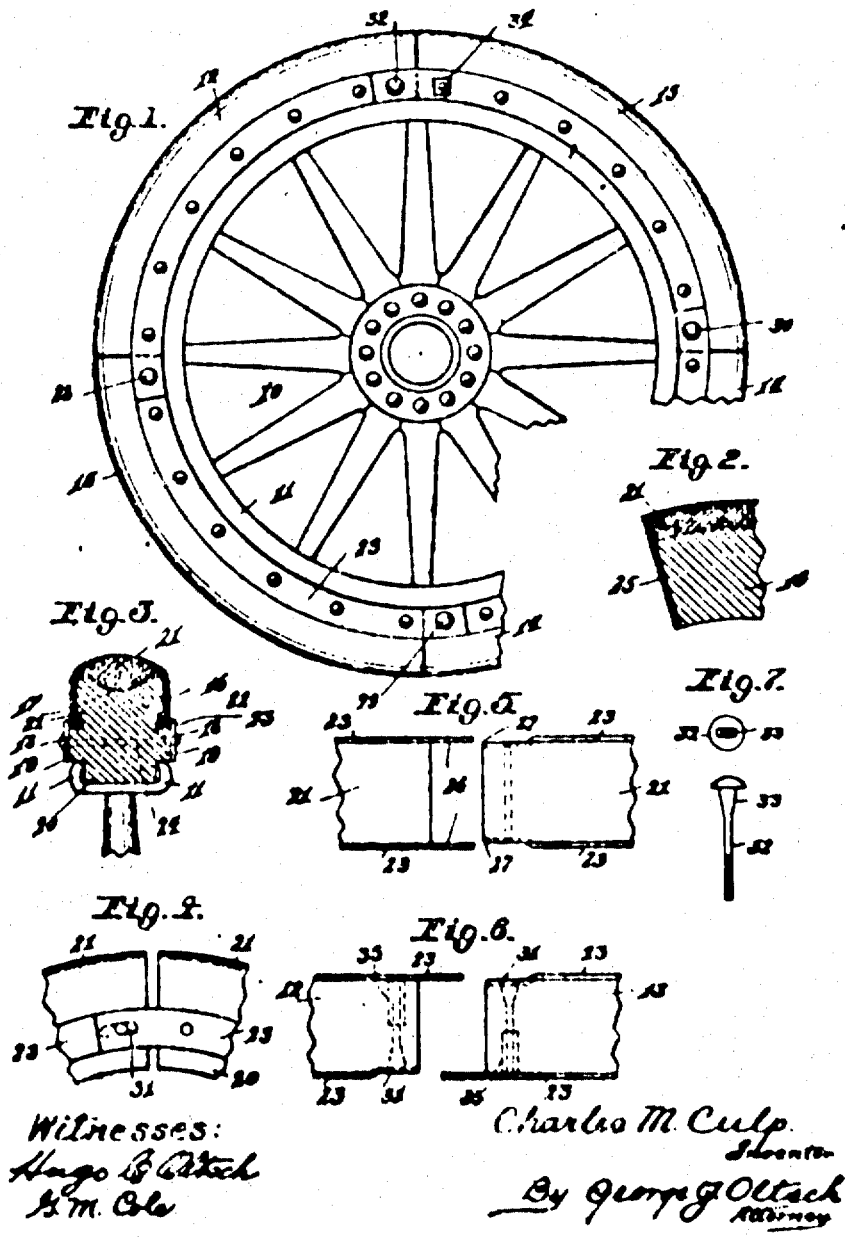

*To all whom it may concern:*

Be it known that I, CHARLES M. CULP, a citizen of the United States, residing at South Bend, in the county of St. Joseph and State of Indiana, have invented certain new and useful Improvements in Emergency-Tires, of which the following is a specification.

My invention relates to emergency tires for automobile and other vehicle wheels.

One object of the present invention is to provide a vehicle tire which is constructed in sections, and which may be handily stored away under the seat of an automobile, or other suitable place, so as to occupy the least possible amount of space.

A further object of the invention resides in the provision of an automobile tire, which may be easily and quickly assembled upon the rim of a wheel, as a substitute for a damaged or otherwise unserviceable tire.

Another object of the invention resides in the provision of a sectional tire which may be assembled upon a clencher rim, and the adjoining ends of two sections drawn together so as to give the tire as a whole a firm binding engagement with the wheel rim.

Another object of the invention resides in the provision of a sectional tire, each section of which embodies means for attachment to the adjoining sections, and when assembled between the flanges of a clencher rim no other securing means will be necessary.

With these and other objects in view, the invention consists of certain novel features of construction as hereinafter described and pointed out in the claims.

In the drawings employed for illustrating the embodiment of the invention: Figure 1 is a side elevation of a clencher wheel showing the tire mounted thereon. Fig. 2 is a fragmentary longitudinal sectional view of one end of a tire section. Fig. 3 is a cross-sectional view of the tire mounted on a clencher wheel rim. Fig. 4 is a side view of two adjoining fragmentary tire sections. Fig. 5 is a top view of the ends of two adjoining tire sections. Fig. 6 is a top view of the ends of two adjoining tire sections, embodying means for drawing the sections together. Fig. 7 is an end and side view respectively of the means for locking and drawing two of the tire sections together.

Referring now more particularly to the accompanying drawings, the reference character 10 represents an automobile wheel of the usual type, having clencher flanges 11, which latter may be of varying construction, it being sufficient for the purpose of permitting the use of the present tire in connection with automobile and other vehicle wheels, that the wheels have side flanges extending beyond the periphery of the rim, the function of such flanges being simply for the purpose of preventing the lateral displacement of the tire.

The tire consists preferably of four sections 12, 13, 14 and 15, the base members 16 of which are preferably of wood having a tough fiber, for the purpose of obtaining both strength and lightness of construction. The base members are concaved in cross-section, as indicated at 17, and have oppositely disposed grooves 18 formed in their sides corresponding to the length and curvature of the members. Each base member has oppositely disposed side portions 19, extending beyond the side faces thereof, and a narrowed lower portion 20, of a width adapted to snugly fit between the clencher flanges and prevent lateral displacement of the tire when fully assembled on the wheel rim. A tread member 21, of flexible or resilient material, preferably rubber, and having a thickened portion of double-convex formation in cross-section, is mounted upon the base member, the inner convex portion being seated in the concaved part of the base and thus held against relative lateral movement, the thickened tread serving as a cushion for the tire.

The rubber tread member is folded over the sides of the base, and inwardly extending ribs 22 formed along the side edges thereof, are seated in the grooves 18, and clamped against displacement by segmental plates 23 which overlap the edges thereof. The plates 23 are shown secured to the base by rivets 24, but it is obvious that bolts and nuts may as well be used for the purpose, so that the same may be readily removed at will and the rubber tread detached for the purposes of repair or replacement.

In practice the ribs are somewhat longer than the depth of the grooves so that, when the plates 23 are tightly drawn against the sides of the base, the ribs will be firmly compressed into the grooves and the tread member securely locked in position. In order to prevent the ends of the wooden bases from being exposed to and absorb water at the section joints, and also to provide a cushion between the joints which will yield and form a tight, compact, anti-rattling joint, the tread member on each section has comparatively thin extensions 25, conforming to the cross-sectional formation of the base, and which are secured to the ends thereof in any suitable manner.

The segmental plates 23 have a treble function, viz,—to lock the tread member to the base, as above described; to connect the ends of the adjoining tire sections to each other when mounted upon the wheel rim, and to add strength to the structure of each section. The plates extend beyond one end of each of the sections 12, 14 and 15, as indicated at 26 in Fig. 5, and both plates terminate with the opposite ends of each of the sections 13, 14 and 15, as indicated at 27, the ends being sunken into the sides of the base for a short distance, so that the extensions 26 of the plates on the adjoining section wil loverlap and come flush therewith. The sections when being mounted upon the wheel rim are detachably locked together by passing threaded bolts 28, 29 and 30, through coinciding bolt holes in the plates and base, and applying a nut to the opposite ends.

In order to firmly bind the tire as a whole to the rim, and to prevent circumferential movement of the tire independent of the wheel, the sections 12 and 13, at their adjoining ends, have one plate on each section and on opposite sides extending beyond the ends, as plainly shown in Fig. 6, so that the plate on one section overlaps the plate which terminates with the end of the adjoining section and vice versa. Each of the plates have elongated apertures, as at 31, and the base members with tapered apertures, as shown by dotted lines in Fig. 6, the elongated apertures fully registering with each other when the ends of the sections 12 and 13 are drawn together, but ordinarily they would but partially register with each other, as shown in Fig. 4. A partial registration of the apertures would permit the small end of the bolt 32 to be passed therethrough, and by forcing same through to the extent of its length, the tapered portion of the shank 33, will draw the plates in opposite directions, and thus cause the tire as a whole, the remaining sections of which have previously been connected together, into tight frictional contact with the periphery of the wheel rim. The wedge bolt 32 has its shank flattened so that it will pass through the elongated openings and at the same time prevent turning of the bolt as the same is drawn through the apertures by the turning of a nut 34, applied to the end thereof. The wedge bolts are applied from opposite sides so as to secure uniformity of pull on the plates on both sides of the tire. The reference 35 in Fig. 6, indicates metallic tubes embedded in the wooden base, the bore of which registers with the aperture of the adjoining plates, so that the ends of the wedge bolts will be properly directed so as to meet the aperture in the plates as the bolts are forced through from the opposite side.

From the foregoing description it will be seen that the sectional tire may be easily and quickly applied to a wheel in an emergency, and when disassembled stored away under the seat or other convenient part of an automobile in a compact manner. Its substitution for the regular clencher tire, which has become deflated by reason of puncture or other causes, permits the machine to be driven without injury to the wheel rim and with practically the same cushioning effect as the regular tire.

Having thus described my invention, what is claimed is:—

1. A sectional emergency tire for automobiles, each section comprising a base portion, a tread portion of resilient, waterproof material extending around the sides and over the ends of the base, and means for securing the tread to the base and connecting the adjoining tire sections.

2. A sectional emergency tire for automobiles, each section comprising a base and a tread member, inwardly extending ribs on the tread member engaging corresponding grooves in the base sides, the end portions of the tread extending over the ends of the base to form a waterproof and anti-rattling joint with the adjoining sections, and means for clamping the tread to the base and forming a locking connection with the adjoining sections.

3. A sectional emergency tire for automobiles, each section comprising a base and a tread portion, locking plates adapted to clamp the side edges of the tread to the base and form a connection between the sections, the plates on two adjoining sections terminating flush with and extending beyond the base ends in alternate relation, so as to overlap each other from opposite directions, and means passing through the overlapping plates and sections from opposite sides to draw the sections together in a uniform manner.

In testimony whereof I affix my signature, in presence of two witnesses.

CHARLES M. CULP.

Witnesses:
 DANIEL RICH,
 LUCRETIA CULP.